United States Patent
Jordan, II et al.

(10) Patent No.: US 10,573,146 B1
(45) Date of Patent: Feb. 25, 2020

(54) SYSTEMS AND METHODS FOR IMPROVED ASSISTED OR INDEPENDENT LIVING ENVIRONMENTS

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Bloomington, IL (US); Torri Wollenschlager, Bloomington, IL (US); Bryan R. Nussbaum, Bloomington, IL (US); Deanna Stockweather, Normal, IL (US); Jeffrey W. Stoiber, Bloomington, IL (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Normal, IL (US); Jennylind Sun, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 1085 days.

(21) Appl. No.: 14/873,865

(22) Filed: Oct. 2, 2015

Related U.S. Application Data

(60) Provisional application No. 62/220,383, filed on Sep. 18, 2015, provisional application No. 62/201,671, (Continued)

(51) Int. Cl.
*G06Q 40/00* (2012.01)
*G06Q 40/08* (2012.01)
(Continued)

(52) U.S. Cl.
CPC ............. *G08B 21/02* (2013.01); *G06Q 40/08* (2013.01); *G08B 21/043* (2013.01); (Continued)

(58) Field of Classification Search
CPC ...................................................... G06Q 40/00
(Continued)

(56) References Cited

U.S. PATENT DOCUMENTS 3,740,739 A * 6/1973 Griffin, III .............. E21B 21/08
166/66
3,817,161 A 6/1974 Koplon
(Continued)

FOREIGN PATENT DOCUMENTS

| CN | 202865924 U | 4/2013 |
|---|---|---|
| WO | WO-2013/076721 A1 | 5/2013 |
| WO | WO-2014/207558 A2 | 12/2014 |

OTHER PUBLICATIONS

U.S. Appl. No. 14/692,864, Nonfinal Office Action, dated May 16, 2017.
(Continued)

*Primary Examiner* — Kirsten S Apple

(57) ABSTRACT

The present embodiments relate to detecting instances of individuals being in peril within an independent or assisted living environment. According to certain aspects, with an individual's permission or affirmative consent, a hardware controller (such as a smart or interconnected home controller, or even a mobile device) may receive and analyze sensor data detected within the independent or assisted living environment to determine whether an individual may be in
(Continued)

peril. In this circumstance, the hardware controller may generate a notification that indicates the situation and may communicate the notification to a proper individual, such as a family member or care giver, who may be in a position to mitigate or alleviate any risks posed by the situation. The foregoing functionality also may be used by an insurance provider to generate, update, or adjust insurance policies, premiums, rates, or discounts, and/or make recommendations to an insured individual.

16 Claims, 6 Drawing Sheets

Related U.S. Application Data filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(51) Int. Cl.
| | |
|---|---|
| *G08B 21/02* | (2006.01) |
| *G08B 21/18* | (2006.01) |
| *H04L 29/08* | (2006.01) |
| *G08B 21/04* | (2006.01) |

(52) U.S. Cl.
CPC ..... *G08B 21/0446* (2013.01); *G08B 21/0461* (2013.01); *G08B 21/182* (2013.01); *H04L 67/12* (2013.01)

(58) Field of Classification Search
USPC .......................................................... 705/35
See application file for complete search history.

(56) References Cited

U.S. PATENT DOCUMENTS

| | | | |
|---|---|---|---|
| 3,875,612 A | | 4/1975 | Poitras |
| 4,066,072 A | * | 1/1978 | Cummins ............ A47C 27/085 128/903 |
| 5,099,751 A | | 3/1992 | Newman et al. |
| 5,128,859 A | | 7/1992 | Carbone et al. |
| 5,554,433 A | | 9/1996 | Perrone, Jr. et al. |
| 5,576,952 A | * | 11/1996 | Stutman ................ G06F 19/322 340/539.1 |
| 5,903,426 A | | 5/1999 | Ehling |
| 6,023,762 A | | 2/2000 | Dean et al. |
| 6,155,324 A | | 12/2000 | Elliott et al. |
| 6,222,455 B1 | | 4/2001 | Kaiser |
| 6,286,682 B1 | * | 9/2001 | d'Arbelles ............. A61B 90/94 206/459.5 |
| 6,526,807 B1 | | 3/2003 | Doumit et al. |
| 6,812,848 B2 | | 11/2004 | Candela |
| 7,030,767 B2 | | 4/2006 | Candela |
| 7,194,416 B1 | | 3/2007 | Provost et al. |
| 7,309,216 B1 | | 12/2007 | Spadola, Jr. et al. |
| 7,348,882 B2 | | 3/2008 | Adamczyk et al. |
| 7,598,856 B1 | | 10/2009 | Nick et al. |
| 7,715,036 B2 | | 5/2010 | Silverbrook et al. |
| 7,809,587 B2 | | 10/2010 | Dorai et al. |
| 7,813,822 B1 | | 10/2010 | Hoffberg |
| 8,031,079 B2 | | 10/2011 | Kates |
| 8,041,636 B1 | | 10/2011 | Hunter et al. |
| 8,106,769 B1 | | 1/2012 | Maroney et al. |
| 8,108,271 B1 | | 1/2012 | Duncan et al. |
| 8,229,861 B1 | | 7/2012 | Trandal et al. |
| 8,280,633 B1 | | 10/2012 | Eldering et al. |
| 8,289,160 B1 | | 10/2012 | Billman |
| 8,316,237 B1 | | 11/2012 | Felsher et al. |
| 8,400,299 B1 | | 3/2013 | Maroney et al. |
| 8,510,196 B1 | | 8/2013 | Brandmaier et al. |
| 8,527,306 B1 | | 9/2013 | Reeser et al. |
| 8,533,144 B1 | | 9/2013 | Reeser et al. |
| 8,595,034 B2 | | 11/2013 | Bauer et al. |
| 8,596,293 B2 | | 12/2013 | Mous et al. |
| 8,605,209 B2 | | 12/2013 | Becker |
| 8,620,841 B1 | | 12/2013 | Filson et al. |
| 8,621,097 B2 | | 12/2013 | Venkatakrishnan et al. |
| 8,650,048 B1 | | 2/2014 | Hopkins, III et al. |
| 8,694,501 B1 | | 4/2014 | Trandal et al. |
| 8,712,893 B1 | | 4/2014 | Brandmaier et al. |
| 8,730,039 B1 | | 5/2014 | Billman |
| 8,731,975 B2 | | 5/2014 | English et al. |
| 8,749,381 B1 | | 6/2014 | Maroney et al. |
| 9,049,168 B2 | | 6/2015 | Jacob et al. |
| 9,280,252 B1 | | 3/2016 | Brandmaier et al. |
| 9,297,150 B2 | | 3/2016 | Klicpera |
| 9,424,606 B2 | | 8/2016 | Wilson, II et al. |
| 9,429,925 B2 | | 8/2016 | Wait |
| 9,652,976 B2 | | 5/2017 | Bruck et al. |
| 9,654,434 B2 | | 5/2017 | Sone et al. |
| 9,824,397 B1 | | 11/2017 | Patel et al. |
| 9,892,463 B1 | | 2/2018 | Hakimi-Boushehri et al. |
| 9,898,912 B1 | | 2/2018 | Jordan, II et al. |
| 2002/0040306 A1 | | 4/2002 | Sugiyama et al. |
| 2004/0054789 A1 | | 3/2004 | Breh et al. |
| 2004/0177032 A1 | | 9/2004 | Bradley et al. |
| 2004/0211228 A1 | | 10/2004 | Nishio et al. |
| 2005/0030175 A1 | | 2/2005 | Wolfe |
| 2005/0080520 A1 | | 4/2005 | Kline et al. |
| 2005/0139420 A1 | | 6/2005 | Spoltore et al. |
| 2005/0251427 A1 | | 11/2005 | Dorai et al. |
| 2005/0275527 A1 | | 12/2005 | Kates |
| 2006/0033625 A1 | | 2/2006 | Johnson et al. |
| 2006/0058612 A1 | * | 3/2006 | Dave ................... A61B 5/0476 600/407 |
| 2006/0100912 A1 | | 5/2006 | Kumar et al. |
| 2006/0154642 A1 | | 7/2006 | Scannell |
| 2006/0184379 A1 | | 8/2006 | Tan et al. |
| 2008/0018474 A1 | | 1/2008 | Bergman et al. |
| 2008/0019392 A1 | | 1/2008 | Lee |
| 2008/0101160 A1 | * | 5/2008 | Besson ................ G04G 15/006 368/12 |
| 2008/0184272 A1 | | 7/2008 | Brownewell |
| 2008/0285797 A1 | | 11/2008 | Hammadou |
| 2009/0001891 A1 | | 1/2009 | Patterson |
| 2009/0044595 A1 | | 2/2009 | Vokey |
| 2009/0094129 A1 | | 4/2009 | Rhodes et al. |
| 2009/0243852 A1 | | 10/2009 | Haupt et al. |
| 2009/0259581 A1 | | 10/2009 | Horowitz et al. |
| 2009/0265193 A1 | | 10/2009 | Collins et al. |
| 2010/0073840 A1 | | 3/2010 | Hennessey, Jr. |
| 2010/0235285 A1 | | 9/2010 | Hoffberg |
| 2010/0241465 A1 | * | 9/2010 | Amigo .................. G06Q 40/08 705/4 |
| 2010/0299217 A1 | | 11/2010 | Hui |
| 2011/0003577 A1 | | 1/2011 | Rogalski et al. |
| 2011/0077875 A1 | | 3/2011 | Tran et al. |
| 2011/0112660 A1 | | 5/2011 | Bergmann et al. |
| 2011/0161117 A1 | | 6/2011 | Busque et al. |
| 2012/0016695 A1 | | 1/2012 | Bernard et al. |
| 2012/0101855 A1 | | 4/2012 | Collins et al. |
| 2012/0116820 A1 | | 5/2012 | English et al. |
| 2012/0166115 A1 | | 6/2012 | Apostolakis |
| 2012/0188081 A1 | | 7/2012 | Van Katwijk |
| 2012/0265586 A1 | | 10/2012 | Mammone |
| 2012/0290333 A1 | | 11/2012 | Birchall |

(56) References Cited

U.S. PATENT DOCUMENTS

| | | | |
|---|---|---|---|
| 2013/0049950 A1 | 2/2013 | Wohlert | |
| 2013/0096960 A1 | 4/2013 | English et al. | |
| 2013/0144486 A1 | 6/2013 | Ricci | |
| 2013/0159021 A1 | 6/2013 | Felsher | |
| 2013/0226624 A1* | 8/2013 | Blessman | G06Q 40/08 705/4 |
| 2013/0234840 A1 | 9/2013 | Trundle et al. | |
| 2013/0257626 A1 | 10/2013 | Masli et al. | |
| 2013/0290013 A1* | 10/2013 | Forrester | G16H 40/63 705/2 |
| 2013/0290033 A1 | 10/2013 | Reeser et al. | |
| 2014/0122133 A1 | 5/2014 | Weisberg et al. | |
| 2014/0136242 A1 | 5/2014 | Weekes et al. | |
| 2014/0180723 A1 | 6/2014 | Cote et al. | |
| 2014/0201315 A1 | 7/2014 | Jacob et al. | |
| 2014/0201844 A1 | 7/2014 | Buck | |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0266717 A1 | 9/2014 | Warren et al. | |
| 2014/0278571 A1 | 9/2014 | Mullen et al. | |
| 2014/0303801 A1 | 10/2014 | Ahn et al. | |
| 2014/0340216 A1 | 11/2014 | Puskarich | |
| 2014/0358592 A1 | 12/2014 | Wedig et al. | |
| 2014/0379156 A1 | 12/2014 | Kamel et al. | |
| 2015/0116112 A1* | 4/2015 | Flinsenberg | G16H 40/20 340/539.11 |
| 2015/0154712 A1 | 6/2015 | Cook | |
| 2015/0160623 A1 | 6/2015 | Holley | |
| 2015/0160636 A1 | 6/2015 | McCarthy, III et al. | |
| 2015/0163412 A1 | 6/2015 | Holley et al. | |
| 2015/0170288 A1 | 6/2015 | Harton et al. | |
| 2015/0206249 A1 | 7/2015 | Fini | |
| 2015/0287310 A1 | 10/2015 | Deliuliis et al. | |
| 2015/0305690 A1* | 10/2015 | Tan | G08B 21/0446 600/301 |
| 2015/0332407 A1 | 11/2015 | Wilson, II et al. | |
| 2015/0364028 A1 | 12/2015 | Child et al. | |
| 2016/0018226 A1 | 1/2016 | Plocher et al. | |
| 2016/0042463 A1 | 2/2016 | Gillespie | |
| 2016/0078744 A1 | 3/2016 | Gieck | |
| 2016/0104250 A1 | 4/2016 | Allen et al. | |
| 2016/0119424 A1* | 4/2016 | Kane | G08B 27/001 709/203 |
| 2016/0188829 A1* | 6/2016 | Southerland | G06Q 10/10 705/2 |
| 2016/0337829 A1* | 11/2016 | Fletcher | H04W 4/90 |
| 2017/0147722 A1 | 5/2017 | Greenwood | |
| 2017/0304659 A1 | 10/2017 | Chen et al. | |
| 2018/0000346 A1* | 1/2018 | Cronin | A61B 5/6898 |
| 2018/0160988 A1* | 6/2018 | Miller | A61B 5/746 |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,942, Nonfinal Office Action, dated Nov. 22, 2017.
U.S. Appl. No. 14/692,961, Nonfinal Office Action, dated Dec. 28, 2017.
U.S. Appl. No. 14/873,914, Nonfinal Office Action, dated Dec. 26, 2017.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,021, Final Office Action, dated Jan. 25, 2018.
U.S. Appl. No. 14/693,032, Final Office Action, dated Mar. 22, 2018.
U.S. Appl. No. 14/693,032, Notice of Allowance, dated Jun. 22, 2018.
U.S. Appl. No. 14/693,039, Nonfinal Office Action, dated May 3, 2018.
U.S. Appl. No. 14/693,057, Final Office Action, dated Feb. 7, 2018.
U.S. Appl. No. 14/873,722, Final Office Action, dated Jun. 15, 2018.
U.S. Appl. No. 14/873,783, Final Office Action, dated May 23, 2018.
U.S. Appl. No. 14/873,823, Final Office Action, dated Jun. 29, 2018.
U.S. Appl. No. 14/873,823, Nonfinal Office Action, dated Feb. 23, 2018.
U.S. Appl. No. 14/873,864, Corrected Notice of Allowability, dated Jan. 18, 2018.
U.S. Appl. No. 14/873,864, Corrected Notice of Allowance, dated Jan. 18, 2018.
U.S. Appl. No. 14/873,942, Nonfinal Office Action, dated Mar. 16, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, filed Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".

(56) References Cited

OTHER PUBLICATIONS

U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".
U.S. Appl. No. 15/895,149, filed Feb. 13, 2018, Jordan et al., Systems and Methods for Automatically Generating an Escape Route.

\* cited by examiner

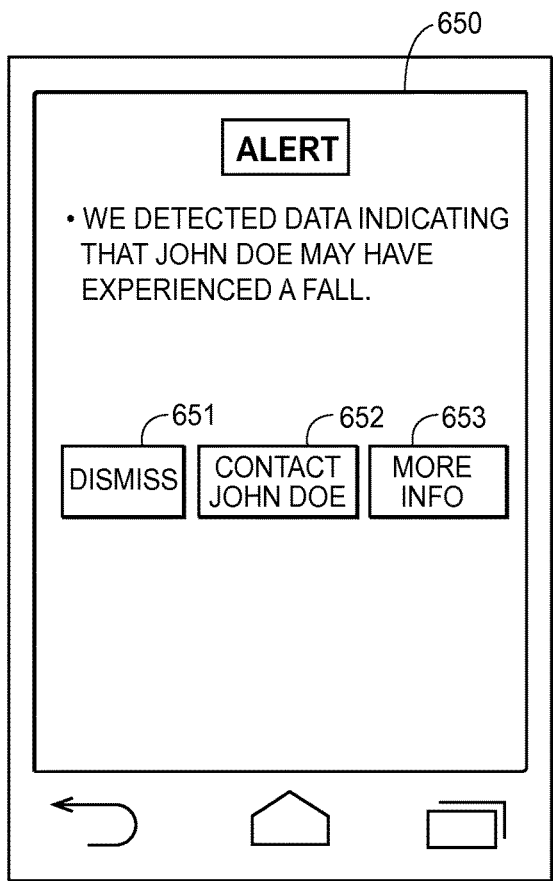 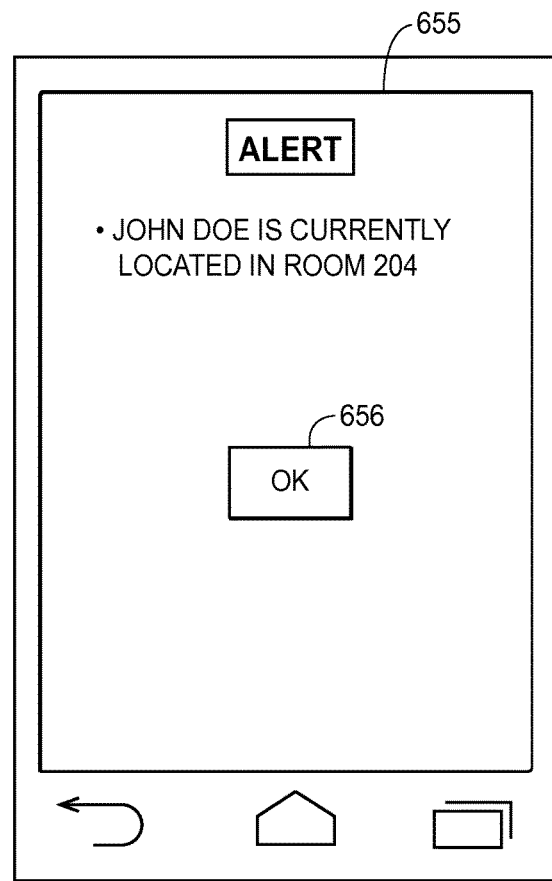
FIG. 6A  FIG. 6B

SYSTEMS AND METHODS FOR IMPROVED ASSISTED OR INDEPENDENT LIVING ENVIRONMENTS

CROSS-REFERENCE TO RELATED APPLICATIONS

This application claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing a connected property. More particularly, the present disclosure relates to assessing sensor data from smart devices in a property to detect when individuals may be in peril, and facilitating actions to mitigate the situation.

BACKGROUND

With the proliferation of the "internet of things," more household devices and items are gaining communication and network connectivity capabilities. The new capabilities are enabling easier data detection and more accurate information and metrics. However, the ability to detect certain conditions associated with devices and items may be limited. Additionally, the channels to control and maintain devices and items as a response to certain conditions may also be limited.

BRIEF SUMMARY

The present embodiments may, inter alia, access certain device data to detect certain conditions and situations within a property and determine actions or commands to perform to address the conditions and situations. Further, the present embodiments may effectively and efficiently communicate relevant information associated with the conditions and enable users to facilitate the actions or commands. One particular functionality relates to analyzing sensor data to detect when one or more individuals may be in peril, such as in an independent or assisted living environment, and then notifying proper individuals of the situation.

Generally, the present embodiments may relate to (1) home control and/or automation, as well as (2) loss prevention, reduction, and/or mitigation through proactively identifying periled individuals, notifying an individual of detected situations, and enabling individuals to mitigate the detected situations. The foregoing functionality also may be used by an insurance provider to generate, update, or adjust insurance policies, premiums, rates, discounts, points, and/or rewards, and/or make recommendations to an insured individual.

According to one embodiment, a computer-implemented method of detecting periled individuals within an independent or assisted living environment may be provided. The independent or assisted living environment may be populated with a hardware controller in communication with a plurality of sensors. The method may include (1) receiving, by the hardware controller, sensor data from at least one sensor located within the independent or assisted living environment, the at least one sensor either (i) secured to an individual or (ii) configured to sense environmental data within a proximity of the individual; (2) analyzing the sensor data by one or more processors; (3) based upon the analyzing, determining that the individual is in peril; (4) responsive to determining that the individual is in peril, generating a notification indicating that the individual is in peril; and/or (5) communicating the notification to an electronic device of an additional individual to facilitate alleviating a risk associated with the individual being in peril. The method may include additional, less, or alternate actions, including those discussed elsewhere herein.

According to another embodiment, a hardware controller for detecting periled individuals within an independent or assisted living environment, where the hardware controller may communication with a set of sensors populated within the independent or assisted living environment, may be provided. The hardware controller may include a communication module adapted to interface with the set of sensors populated within the independent or assisted living environment; a memory adapted to store non-transitory computer executable instructions; and/or a processor adapted to interface with the communication module and the memory. The processor may be configured to execute the non-transitory computer executable instructions to cause the processor to receive, via the communication module, sensor data from at least one sensor of the set of sensors located within the independent or assisted living environment, the at least one sensor either (i) secured to an individual or (ii) configured to sense environmental data within a proximity of the individual, analyze the sensor data, based upon the analyzing, determine that the individual is in peril, responsive to determining that the individual is in peril, generate a notification indicating that the individual is in peril, and/or communicate, via the communication module, the notification to an electronic device of an additional individual to facilitate alleviating a risk associated with the individual being in peril. The hardware controller may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIGS. 6A and 6B depict exemplary interfaces associated with notifying of periled individuals and facilitating various actions to mitigate the situations, in accordance with some embodiments.

Figure 1:
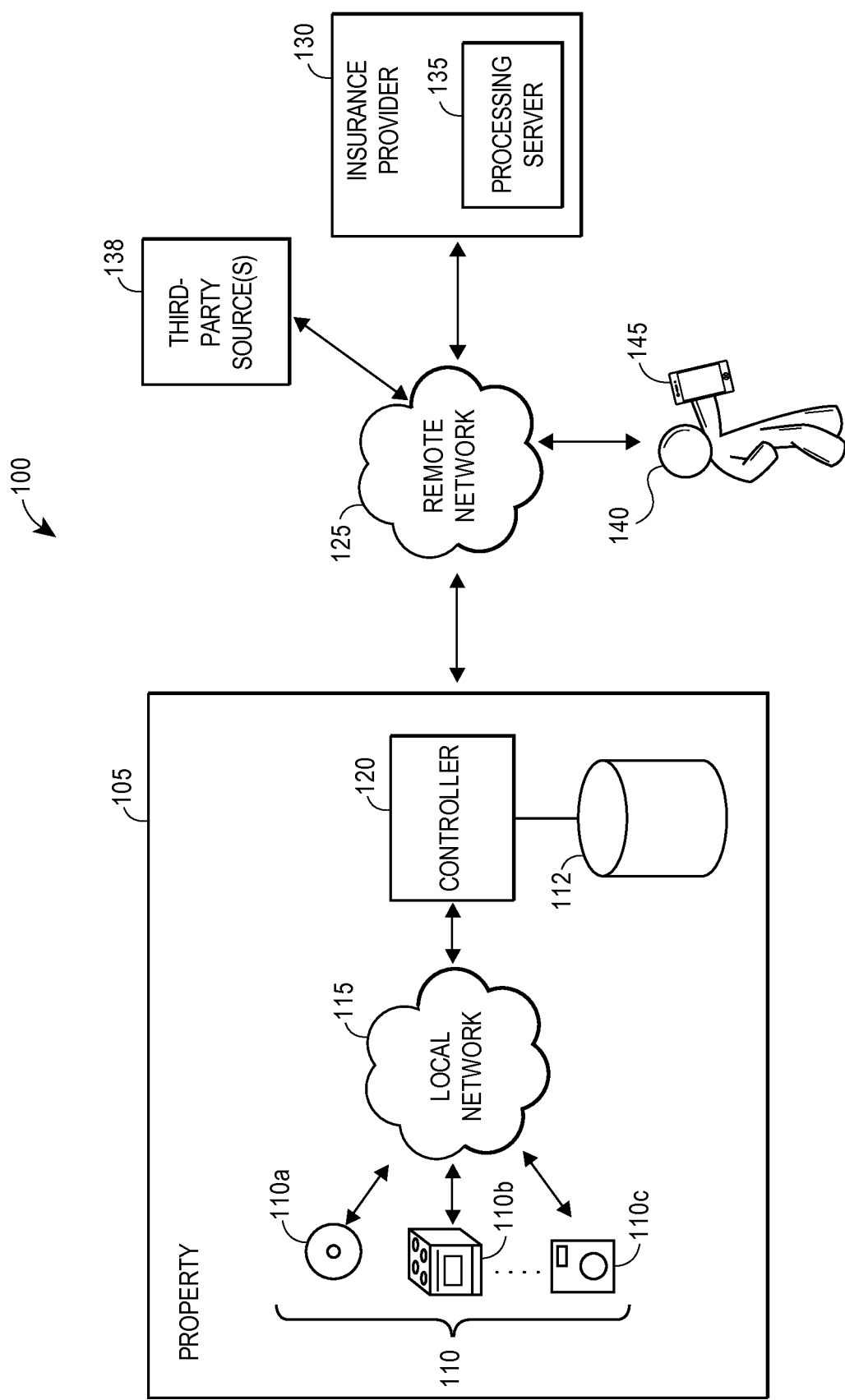
FIG. 1 depicts an exemplary environment including components and entities associated with managing device operation and facilitating insurance policy processing, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, assessing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider or other entity, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; wearable devices; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various situations indicated by the data and/or actions to facilitate based upon the analysis. In particular, the central controller and/or insurance provider remote processor(s) may receive operation data from the smart devices, where the operation data may include various sensor data associated with the smart devices. The central controller and/or insurance provider remote processor(s) may analyze the operation data (e.g., by comparing the operation data to baseline sensor data) to detect that an individual may be in peril, or otherwise exposed to injury, loss, destruction and/or the like. According to embodiments, the individual be located within an independent or assisted living environment. In these situations, the central controller and/or the insurance provider may generate a notification that indicates the situation and may communicate the notification to a proper individual who may be in position to help the individual in peril. The central controller and/or insurance provider may also determine to process an insurance policy that may be impacted by the situation.

The systems and methods discussed herein address a challenge that is particular to property management. In particular, the challenge relates to a difficulty in identifying when an individual located on a premises may be in peril or otherwise in need of help, as well as a difficulty in mitigating the situation. This is particularly apparent when the individual is not under constant care or connected to conventional monitoring machines. Existing environments rely on individuals to self-report situations and/or rely on caregivers to happen upon the situations. However, these existing environments still result in numerous situations that go unaddressed as a result of nobody noticing situations or the individual being unable to call or signal for assistance. In contrast, the present systems and methods leverage sensor data from connected devices to detect and identify situations in which individuals may be in peril or otherwise in need of assistance, and dynamically generate notifications of the same and send the notifications to proper individuals in position to offer assistance. Therefore, because the systems and methods employ the collection and analysis of sensors data associated with connected devices within the property, the systems and methods are necessarily rooted in computer technology in order to overcome the noted shortcomings that specifically arise in the realm of property management.

Similarly, the systems and methods provide improvements in a technical field, namely, property automation and safety. Instead of the systems and methods merely being performed by hardware components using basic functions, the systems and methods employ complex steps that go beyond the mere concept of simply retrieving and combining data using a computer. In particular, the hardware components receive data from connected devices, analyze the data identify a potentially threatening situation for an individual, generating a notification that indicates the potentially threatening situation, and/or communicate the notification to a proper individual. Additionally, because a central controller in a property retrieves and analyzes sensor data from a plurality of connected devices in the property, the central controller and the connected devices are part of a "thin client" environment that improves data persistence and information processing. This combination of elements further impose meaningful limits in that the operations are applied to improve property automation and safety by detecting potentially threatening situations, and facilitating mitigating actions in a meaningful and effective way.

According to implementations, the systems and methods may support a dynamic, real-time or near-real-time analysis of any received data. In particular, the central controller and/or insurance provider may retrieve and/or receive real-time sensor data from the sensors, analyze the sensor data in real-time, and dynamically determine that an individual is in peril. Additionally, the central controller and/or insurance provider may dynamically generate a notification of the situation in real-time, and communicate the notification to another individual in real-time. Accordingly, the real-time capability of the systems and methods enable the individuals in peril with an assurance of efficient and effective treatment should the individuals be in peril, and enable any caregivers with real-time notifications that individuals are in peril.

Generally, the systems and methods offer numerous benefits relating to the safety of individuals. In particular, the systems and methods may automatically detect situations in which individuals may be in peril, and may automatically facilitate actions to address the situations. As a result, the safety of individuals may improve, especially in independent or assisted living environments. Further, the systems and methods enable additional individuals to be notified of the situations so that the additional individuals are able to promptly address the situations.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, or life insurance policy, premium, or discount) based upon the assisted living and/or other functionality discussed herein, and/or an insured having a home and/or mobile device with such functionality.

I. Exemplary Environment and Components for Assessing Device Operation and Functionalities Relating Thereto FIG. 1 depicts an exemplary environment 100 including components and entities for managing devices associated with a property and processing insurance policies associated therewith. Although FIG. 1 depicts certain entities, components, and devices, it should be appreciated that additional, fewer, or alternate entities and components are envisioned.

As illustrated in FIG. 1, the environment 100 may include a property 105 that contains a controller 120 and a plurality of devices 110 that may be each connected to a local communication network 115. According to the present embodiments, the property 105 may be an independent or assisted living environment in which one or more individuals needing independent or assisted living care may reside. The independent or assisted living environment may employ caregivers who provide care to the residents as needed. However, it should be appreciated that the property 105 may be other types of properties, such as a private residence, an office, a hotel, or the like.

Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110a, a smart stove 110b, and/or a smart washing machine 110c. Each of the plurality of devices 110 may be located within or proximate to the property 105 (generally, "on premises"). In one implementation, one or more of the plurality of devices 110 may be a device that is wearable by an individual, such as a heart rate monitor, a pedometer, a blood pressure monitor, or other types of wearable devices or monitors. Although FIG. 1 depicts only one property 105, it should be appreciated that multiple properties are envisioned, each with its own controller and devices. Further, it should be appreciated that additional, fewer, or alternate devices may be present in the property 105.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For instance, a homeowner may purchase an alarm system that installs sensors on or near a door to detect when a door has been opened and/or unlocked.

In some embodiments, the plurality of devices 110 may monitor their own status or condition via the sensors to detect any issues or problems. In response to detecting issues or problems, the plurality of devices 110 may be able to indicate the issues or problems via display components, such as LED lights, display screens, or other visual indicators. In further embodiments, the controller 120 may be configured to monitor, via sensor data, whether the plurality of devices 110 and/or parts thereof have been installed correctly, whether replacement parts are new and/or otherwise in good condition, and/or other conditions associated with the plurality of devices 110 and/or parts thereof.

The plurality of devices 110 may be configured to communicate with a controller 120 via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols, such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115 (and/or to the insurance provider 130 remote processing server 135 via the network 125), operational data gathered from sensors associated with the plurality of devices 110. The operational data may be audio data, image or video data, motion data, status data, usage amounts, vital sign data, and/or other data or information. For instance, the operational data may include imaging or audio data recorded within a room; a heart rate of an individual wearing one of the plurality of devices 110; and/or other information that may be pertinent to an operation state or status of the plurality of devices 110. For further instance, the operational data may include motion data that may indicate the presence of and movement of any individuals within the property 105 and/or located on the exterior of the property 105. Additionally, the operational data may include device usage data. The operational data may include a timestamp representing the time that the operational data was recorded.

The controller 120 may be coupled to a database 112 that stores various operational data and information associated with the plurality of devices 110. Although FIG. 1 depicts the database 112 as coupled to the controller 120, it is envisioned that the database 112 may be maintained in the "cloud" such that any element of the environment 100 capable of communicating over either the local network 115 or one or more other networks 125 may directly interact with the database 112.

In some embodiments, the database 112 may organize the operational data according to which individual device 110 the data may be associated and/or the room or subsection of the property in which the data was recorded. Further, the database 112 may maintain an inventory list that includes the plurality of devices 110, as well as various data and information associated with the plurality of devices 110 (e.g., locations, replacement costs, etc.).

In one embodiment, the database 112 may maintain various operation states of the plurality of devices 110. In particular, the operation states may specify various settings of the plurality of devices 110 such that when the respective device is configured at the setting(s), the respective device will operate in the corresponding operation state. For instance, an operation state for a smart thermostat may be "heat conservation" whereby the corresponding setting is 64 degrees (as opposed to a more "normal" 70 degree setting). It should be appreciated that each operation state may specify settings for more than one of the devices 110.

The controller 120 (and/or the plurality of devices 112) may be configured to communicate with other components and entities, such as an insurance provider 130 and various third party source(s) 138 via the network(s) 125. According to some embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). In some cases, both the local network 115 and the network 125(s) may utilize the same technology.

Generally, the insurance provider 130 may be any individual, group of individuals, company, corporation, or other type of entity that may issue insurance policies for customers, such as a home insurance policy associated with the property 105. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For instance, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

The third-party source(s) 138 may represent any entity or component that is configured to obtain, detect, and/or determine data or information that may be relevant to the devices 110 of the property 105. In some embodiments, the third-party source(s) 138 may be a manufacturer, supplier, servicer, or retailer of the any of the devices 110, as well as for replacement devices for the devices 110. For instance, if one of the devices 110 is a refrigerator, the third-party source 138 may be refrigerator manufacturer that sells refrigerators of the same or different types or models as the refrigerator device 110. The third-party source(s) 138 may store data associated with a replacement device (e.g., cost, retail location, general information, availability, or the like). Further, the third-party source(s) 138 may store baseline data associated with various types of situations in which individuals may be in peril. The third-party source(s) 138 may be configured to communicate various data or information to the controller 120 and/or to the insurance provider 130 via the network(s) 125, whereby the controller 120 and/or the insurance provider 130 may examine the data or information to facilitate various functionalities.

The controller 120, the insurance provider 130 and/or the processing server 135, and the third-party source(s) 138 may also be in communication, via the network(s) 125, with an electronic device 145 associated with an individual 140. In some embodiments, the individual 140 may have an insurance policy (e.g., a long-term care insurance policy) associated with the property 105, or may otherwise be associated with the property 105 (e.g., the individual 140 may live in the property 105). The individual 140 may also be associated with a resident of the property 105 (e.g., a family member of a person who resides in the property 105). The electronic device 145 may be a mobile device, such as a smartphone, a desktop computer, a laptop, a tablet, a phablet, a smart watch, smart glasses, wearable electronics, pager, personal digital assistant, or any other electronic device, including computing devices configured for wireless radio frequency (RF) communication and data transmission. In some implementations, the controller 120 (and/or insurance provider 130 remote processing server 135) may communicate, to the individual 140 via the electronic device 145, an indication of the operation of the plurality of devices 110, such as the commands transmitted to the plurality of devices 110. Further, the controller 120 (and/or insurance provider 130 remote processing server 135) may enable the individual 140 to remotely control various of the plurality of devices 110 via the electronic device 145.

According to some other implementations, the controller 120 (and/or insurance provider 130 remote processing server 135) may analyze sensor data from any of the plurality of devices 110 to determine if one or more individuals may be in peril or otherwise in need of help or assistance. The controller 120 (and/or insurance provider 130 remote processing server 135) may generate notifications or alerts that may indicate the situation, and communicate the notifications or alerts to the electronic device 145 via the network 125. Further, the controller 120 (and/or insurance provider 130 or remote processing server 135) may determine any changes to or processing associated with an insurance policy that may result from the situation, and may communicate with the remote processing server 135 to facilitate the processing.

The controller 120 (and/or insurance provider 130 remote processing server 135) may also transmit any modifications to insurance policies based upon detected data from the plurality of devices 110. In response, the individual (e.g., a policyholder) may accept the proposed insurance claim or make modifications to the proposed insurance claim, and/or otherwise accept/reject any modifications to the insurance policy. The electronic device may transmit, via the network 125, the accepted or modified insurance claim back to the controller 120 (and/or insurance provider 130 remote processing server 135).

The controller 120 may facilitate any processing of the insurance claim with the processing server 135 of the insurance provider 130. Additionally or alternatively, the processing server 135 may facilitate the proposed insurance claim communications and processing directly with the customer 140. In some implementations, the insurance provider 130 remote processing server 135 may provide the same functionality as that described herein with respect to the controller 120.

Figure 2:
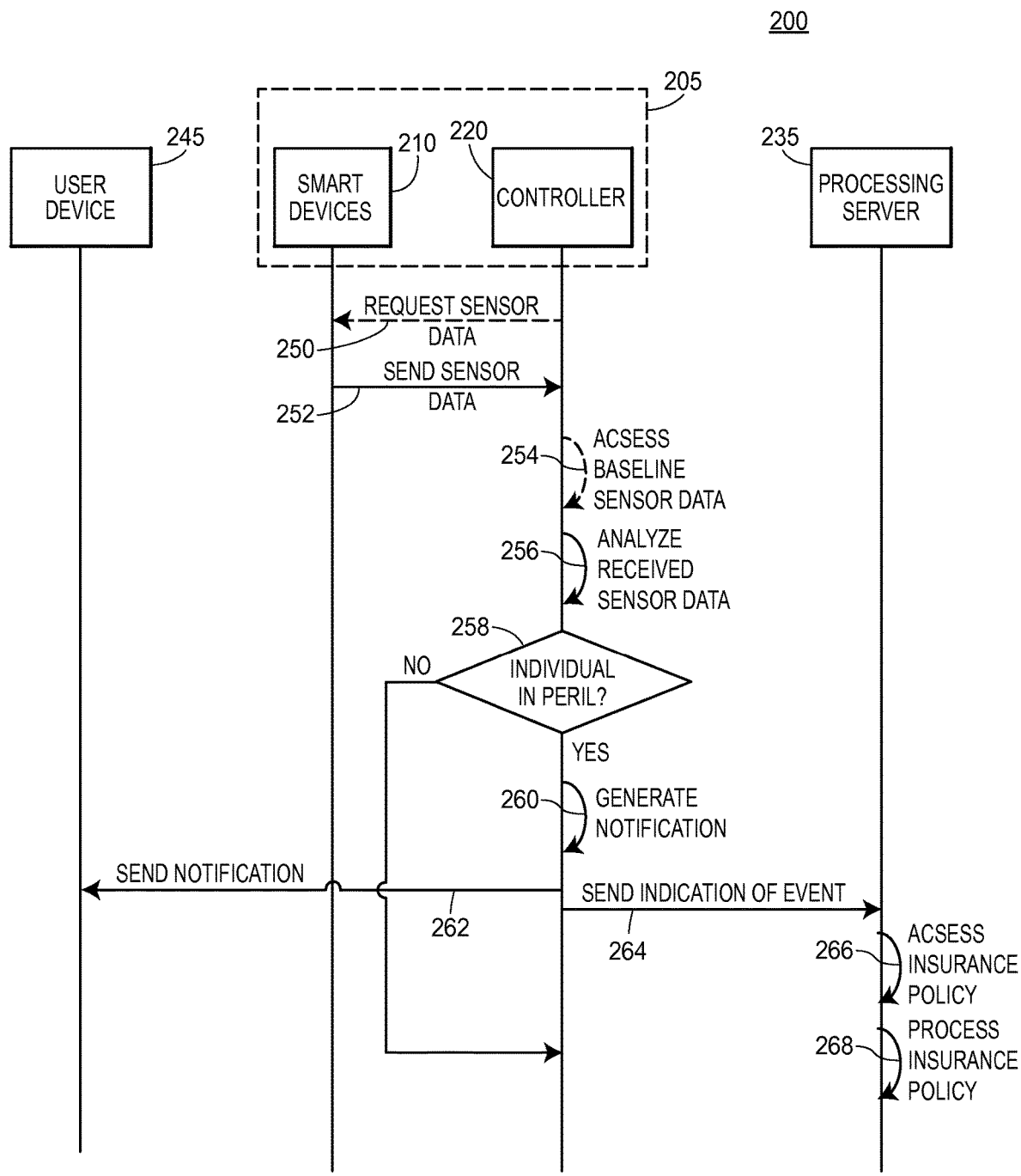
FIG. 2 is an exemplary signal diagram associated with assessing sensor data to detect individuals in peril and facilitating various actions to mitigate the situations, in accordance with some embodiments.

II. Exemplary Communication Flow for Detecting when Individuals are in Peril and Communicating Notifications Relating Thereto Referring to FIG. 2, illustrated is an exemplary signal diagram 200 associated with detecting when individuals may be in peril and communicating notifications relating thereto. FIG. 2 includes a set of smart devices 210 (such as the smart devices 110 as discussed with respect to FIG. 1), a controller 220 (such as the controller 120 as discussed with respect to FIG. 1), a processing server 235 (such as the processing server 135 as discussed with respect to FIG. 1), and a user device 245 (such as the user device 145 as discussed with respect to FIG. 1).

The smart devices 210 and the controller 220 may be located within an independent or assisted living environment 205 (which generally may be the property 105 as discussed with respect to FIG. 1). The individual who may be in peril may be an individual who resides in the independent or assisted living environment 205 and who may receive care by employees or other workers of the independent or assisted living environment 205. According to embodiments, the smart devices 210 may include a set of sensors configured to generate and communicate various sensor data. Further, according to embodiments, the user device 245 may belong to an individual associated with the independent or assisted living environment 205, such as an employee or worker, a resident of the independent or assisted living environment 205, a caregiver, caretaker, and/or family member of an individual residing in the independent or assisted living environment 205, or an individual otherwise associated with an individual residing in the independent or assisted living environment 205.

The signal diagram 200 may begin when the controller 220 optionally requests (250) the smart devices 210 for sensor data. In some implementations, the controller 220 may periodically request the smart devices 210 for sensor data, or the controller 220 may request the smart devices 210 for sensor data in response to various triggers (e.g., at a certain time of the day or in response to receiving particular sensor data from a particular smart device 210). The controller 220 may also request sensor data from one or more specific smart devices 210. In an implementation, the smart device(s) 210 may be devices configured to be worn by an individual, such as a resident of the independent or assisted living environment 205.

The smart device(s) 210 may send (252) sensor data to the controller 220. For example, the sensor data may be audio data, imaging data (e.g., images and/or videos), motion/movement sensor data, location data, and/or vital sign data. It should be appreciated that other types of sensor data and combinations of sensor data are envisioned. The smart device(s) 210 may provide the sensor data automatically as the data is detected, in response to receiving a request from the controller 220, or in response to various triggers. For example, the smart device 210 may be a heart rate monitor that may send heart rate data of an individual to the controller 220 when the corresponding heart rate exceeds 120 beats/minute. For further example, the smart device 210 may be a band wearable by an individual that may send acceleration data to the controller 220 when the corresponding acceleration exceeds a certain threshold (which may be indicative of a fall).

The controller 220 may optionally access (254) baseline sensor data that may correspond to the received sensor data. In particular, if the controller 220 receives sensor data or a particular type (e.g., acceleration data), the controller 220 may access baseline data of the same type (e.g., baseline acceleration data). The controller 220 may analyze (256) the received sensor data. In particular, the controller 220 may analyze the received sensor data to determine whether there are any abnormalities, causes for concern, and/or the like. In one implementation, the controller 220 may compare the received sensor data to the baseline sensor data to determine a level of similarity, where the level of similarity may meet a set threshold value. In another implementation, the controller 220 may compare the received sensor data to any corresponding threshold levels which may indicate any abnormalities, causes for concert, and/or the like.

Based upon the analysis of (256), the controller 220 may determine (258) if the individual is in peril. In particular, if the received sensor data meets or exceeds any threshold level (or differs from any threshold level by a certain amount or percentage), or if any calculated similarity level meets a threshold value, then the controller may deem that an individual is in peril. For example, if the received sensor data is audio data having a decibel reading and the controller 220 determines that the decibel reading exceeds a threshold decibel level, then the controller 220 may deem that the individual is in peril (such as if the individual is summoning help).

In one embodiment, the controller 220 may examine various combinations of sensor data (e.g., audio data, imaging data, motion/movement sensor data, location data, and/or vital sign data) to assess the situation. For example, the controller 220 may determine that the individual's heart rate is above a threshold amount, but may also determine that the individual is currently located in a fitness center, and therefore deem that the individual is not in peril. Conversely, the controller 220 may determine that the individual's heart rate is above a threshold value, and may determine that the individual is located in his or her room, and therefore deem that the individual may be in peril.

If the controller 220 determines that the individual is not in peril ("NO"), processing may end or proceed to other functionality. If the controller 220 determines that the individual is in peril ("YES"), the controller may generate (260) a notification indicating that the individual is in peril. In embodiments, the notification may include any details of the situation and may also include various selections that enable a receiving individual (e.g., an individual associated with the user device 245) to initiate help or aid for the individual in peril. For example, the notification may include contact information for the independent or assisted living environment 205 and/or for an individual associated therewith.

The controller 220 may send (262) the notification to the user device 245, so that the individual associated with the user device 245 may access and review the notification. As discussed above, the individual associated with the user device 245 may review the notification and take any appropriate action, in particular any action that may alleviate the situation resulting from the individual residing in the independent or assisted living environment 205 being in peril. For example, if the individual associated with the user device 245 is a caregiver employed by the independent or assisted living environment 205, the caregiver may access the room of the individual and provide any needed care, or may summon appropriate medical personnel.

In some embodiments, the controller 220 may also facilitate insurance processing associated with the situation of the individual. In particular, the controller may send (264) an indication of the event (i.e., the individual being in peril) to the processing server 325, via one or more standard channels. The processing server 325 may examine the indication of the event and access (266) an insurance policy that may belong to the individual in peril (i.e., the individual in peril may be a policy holder for the insurance policy). The processing server 235 may also process (268) the insurance policy accordingly. In particular, the processing server 235 may determine whether the individual being in peril may impact the insurance policy, and may adjust the insurance policy accordingly, such as by adjusting the insurance policy to insure a particular type of care that was previously not needed by the individual.

Although FIG. 2 depicts the controller 220 performing various steps and determinations, it should be appreciated that the processing server 235 may perform the same or similar steps or determinations. For example, the processing server 235 may receive the sensor data, compare the sensor data to baseline data, generate a notification, communicate a notification, determine a mitigating action, and/or facilitate the mitigating action.

III. Exemplary Method for Detecting Individuals in Peril

Figure 3:
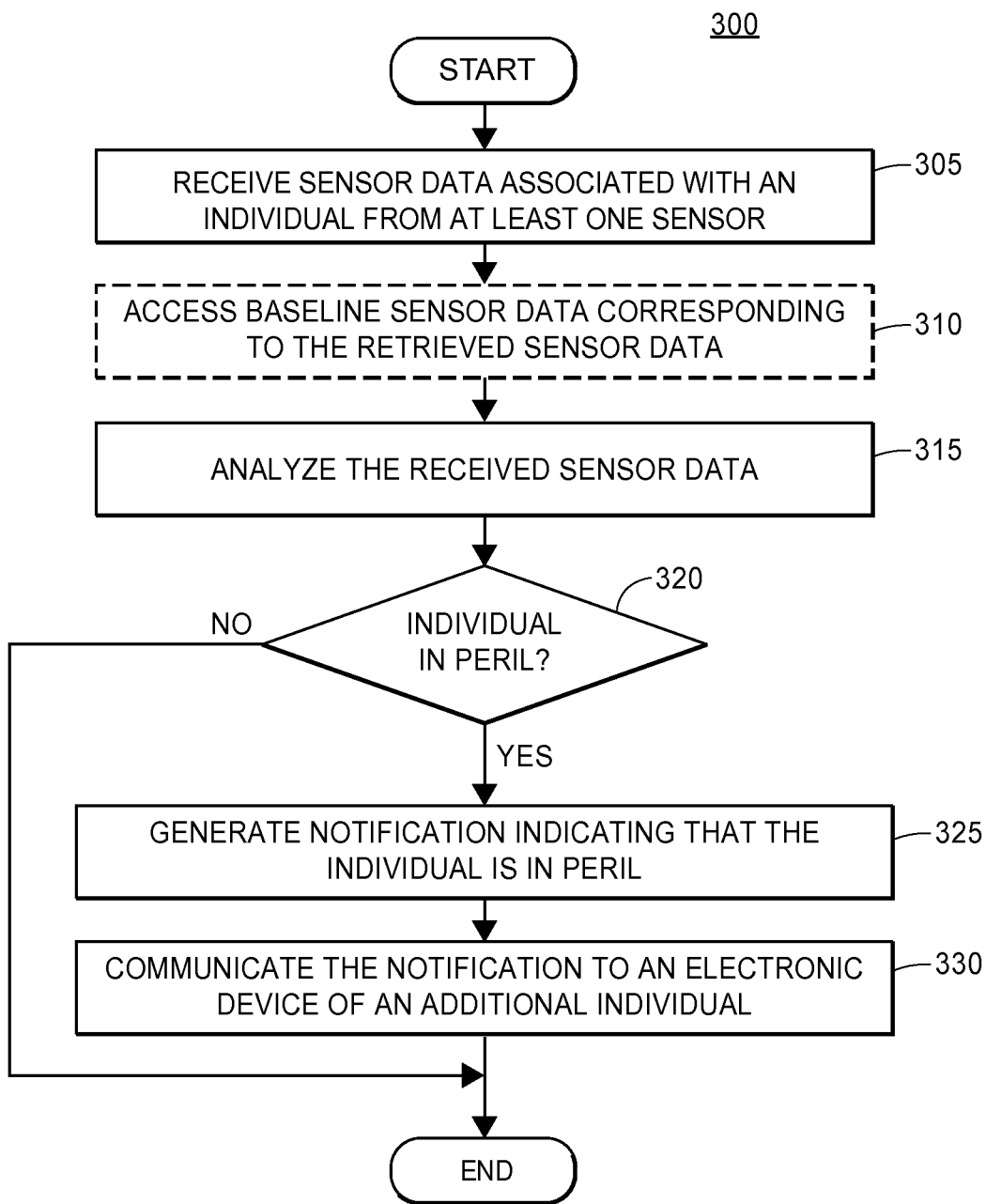
FIG. 3 is a flow diagram of an exemplary computer-implemented method of assessing sensor data to detect individuals in peril and facilitating various actions to mitigate the situations, in accordance with some embodiments.

Referring to FIG. 3, depicted is a block diagram of an exemplary computer-implemented method 300 of detecting individuals who may be in peril within an independent or assisted living environment (and/or abnormal conditions associated with individuals or premises). The method 300 may be facilitated by an electronic device within the property, such as the controller 120 that may be in direct or indirect communication with an insurance provider (such as the insurance provider 130 or a remote processor or server thereof).

The method 300 may begin when the controller receives (block 305) sensor data associated with an individual from at least one sensor. In some embodiments, the sensor may be secured to the individual (e.g., a wearable device including an accelerometer, a heart rate monitor, a vital signs monitor, and/or the like) or configured to sense environmental data within a proximity of the individual (e.g., an audio sensor, a device usage sensor, a video camera, and/or the like). In one implementation, the controller may request the sensor data from the at least one sensor.

The controller may optionally access (block 310) baseline sensor data corresponding to the retrieved sensor data. In some implementations, the retrieved sensor data may have a specific type (e.g., wearable device data, recorded video, recorded audio), where the controller may access baseline sensor data that corresponds to the type of retrieved sensor data. The controller may analyze (block 315) the received sensor data according to various calculations, techniques, or algorithms. The analysis may determine whether the retrieved sensor data is consistent with or reflects that the individual is in peril (and/or abnormal condition exists). In particular, the controller may determine whether the sensor data meets or exceeds any threshold level (or differs from any threshold level by a certain amount or percentage), or whether any calculated similarity level meets a threshold value.

For example, if a microphone detects a loud crash that exceeds a certain decibel level (which may be associated with the individual falling), then the controller may determine that the individual is in peril. For further example, if the sensor data indicates a heart rate that is dropping by a certain amount or percentage, then the controller may determine that the individual is in peril.

If the controller determines that the individual is not in peril ("NO"), then processing may end or proceed to any other functionality. If the controller determines that the individual is in peril ("YES"), then the controller may generate (block 325) a notification indicating that the individual is in peril. In some implementations, the notification may include various information, such as an identification of the individual, a current location of the individual, a description of the situation and/or abnormal condition, contact information of relevant individuals, and/or other information.

The controller may communicate (block 330) the notification to an electronic device of an additional individual. The controller may store an identification of the electronic device. For example, the electronic device may be a smartphone belonging to a caregiver associated with the individual. In some scenarios, the controller may communicate the notification to an insurance provider.

IV. Exemplary Controller

Figure 4:
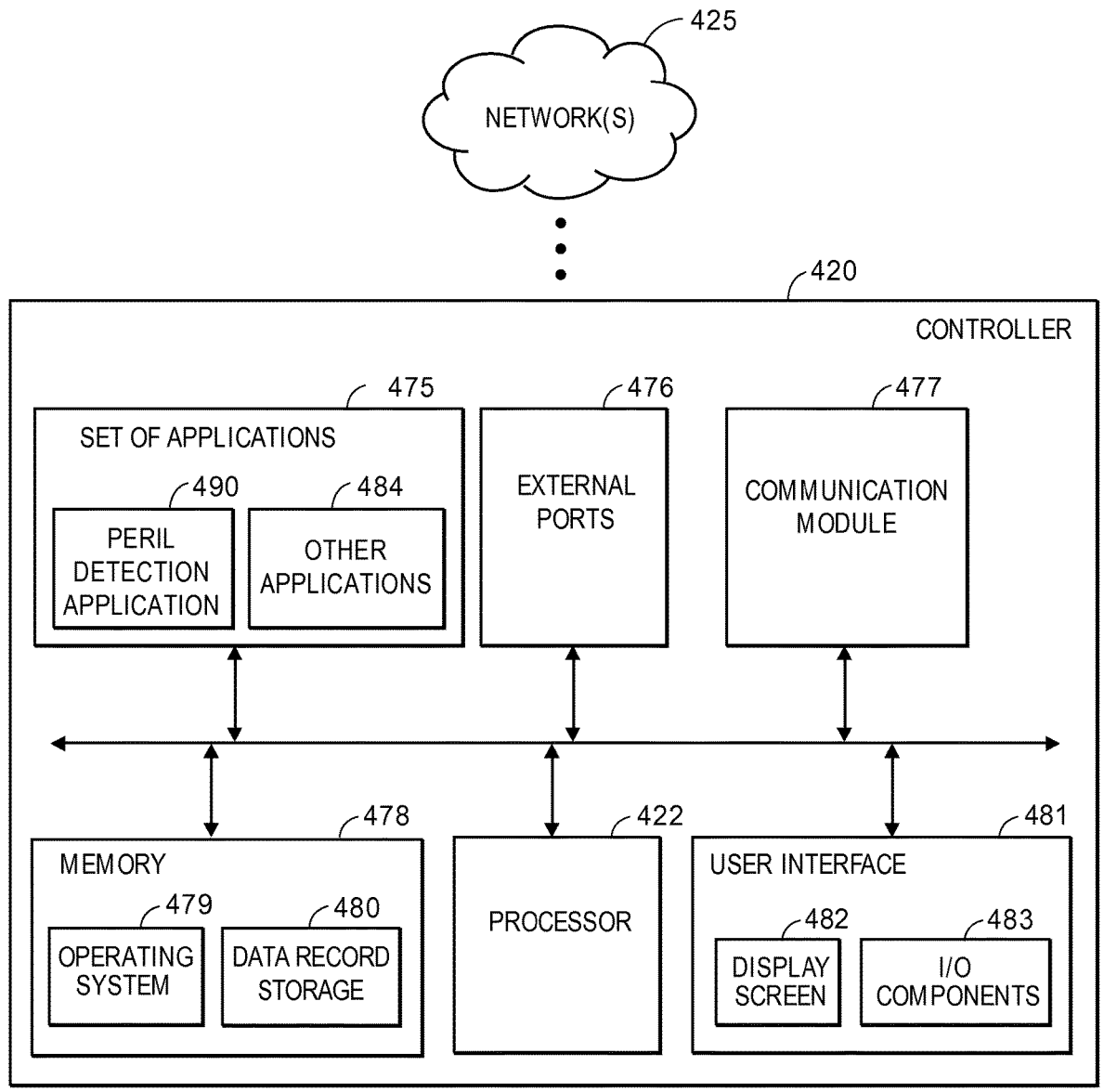
FIG. 4 is a block diagram of an exemplary controller in accordance with some embodiments.

FIG. 4 illustrates a diagram of an exemplary controller 420 (such as the controller 120 discussed with respect to FIG. 1) in which the functionalities as discussed herein may be implemented. It should be appreciated that the controller 420 may be associated with a property, as discussed herein.

The controller 420 may include a processor 422 as well as a memory 478. The memory 478 may store an operating system 479 capable of facilitating the functionalities as discussed herein, as well as a set of applications 475 (i.e., machine readable instructions). For instance, one of the set of applications 475 may be a peril detection application 484 configured to analyze sensor data, detect when individuals may be in peril, and facilitate actions to mitigate the detected situations. The set of applications 475 may also include one or more other applications 484, such as an insurance processing application.

The processor 422 may interface with the memory 478 to execute the operating system 479 and the set of applications 475. According to some embodiments, the memory 478 may also include a data record storage 480 that stores various data, such as baseline data corresponding to various types of sensor data. The peril detection application 484 may interface with the data record storage 480 to retrieve relevant baseline data that the peril detection application 484 may use to determine whether individuals may be in peril. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 420 may further include a communication module 477 configured to communicate data via one or more networks 425. According to some embodiments, the communication module 477 may include one or more transceivers (e.g., WWAN, WLAN, and/or WPAN transceivers) functioning in accordance with IEEE standards, 3GPP standards, or other standards, and/or configured to receive and transmit data via one or more external ports 476. Further, the communication module 477 may include a short-range network component (e.g., an RFID reader) configured for short-range network communications. For instance, the communication module 477 may receive, via the network 425, sensor data from a plurality of devices populated within a property.

The controller 420 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs, speakers, microphones). According to some embodiments, the user may access the controller 420 via the user interface 481 to assess sensor data, process insurance policies, and/or perform other functions. The controller 420 may be configured to perform insurance-related functions, such as generating proposed insurance claims and facilitating insurance claim processing. In some embodiments, the controller 420 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 422 (e.g., working in connection with the operating system 479) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

V. Exemplary Server

Figure 5:
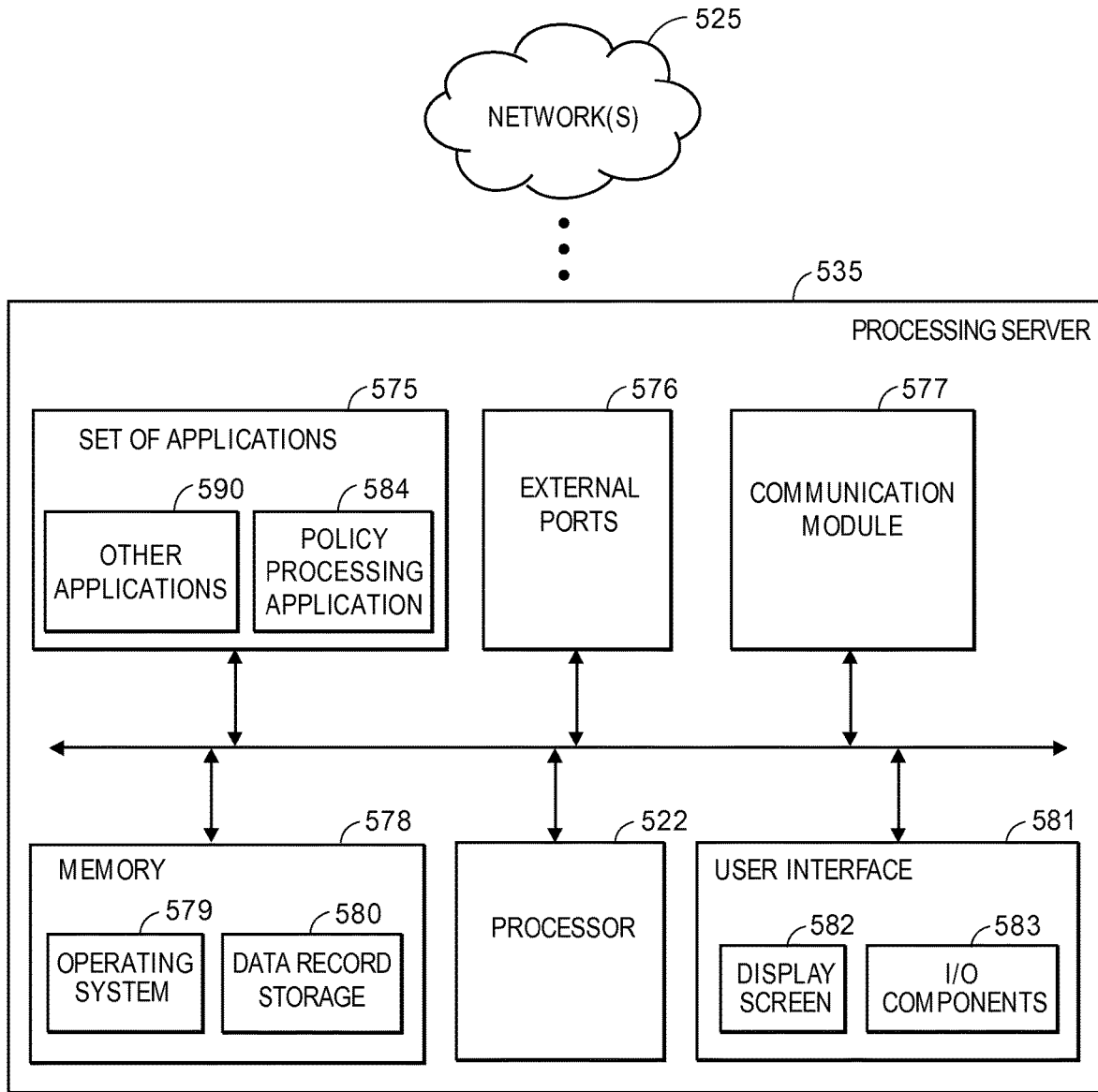
FIG. 5 is a block diagram of an exemplary processing server in accordance with some embodiments.

FIG. 5 illustrates a diagram of an exemplary processing server 535 (such as the processing server 135 discussed with respect to FIG. 1) in which the functionalities as discussed herein may be implemented. It should be appreciated that the processing server 535 may be associated with an insurance provider, as discussed herein. In one embodiment, the processing server may be configured with the same functionality as that of the controllers 120, 220 of FIGS. 1 and 2, respectively.

The processing server 535 may include a processor 522, as well as a memory 578. The memory 578 may store an operating system 579 capable of facilitating the functionalities as discussed herein as well as a set of applications 575 (i.e., machine readable instructions). For instance, one of the set of applications 575 may be a policy processing application 584 configured to manage customer insurance policies. It should be appreciated that other applications 590 are envisioned, such as a peril detection application configured to determine whether individuals may be in peril.

The processor 522 may interface with the memory 578 to execute the operating system 579 and the set of applications 575. According to some embodiments, the memory 578 may also include a data record storage 580 that stores various information associated with customer insurance policies, as well as baseline data corresponding to a set of default sensor data and thresholds relating thereto. The policy processing application 584 may interface with the data record storage 580 to retrieve relevant information that the policy processing application 584 may use to manage insurance policies, generate notifications, and/or perform other functionalities, such as determine whether individuals are in peril. Further, the device replacement application may interface with the data record storage 580 to retrieve device information. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 535 may further include a communication module 577 configured to communicate data via one or more networks 525. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For instance, the communication module 577 may transmit, via the network 525, baseline data corresponding to a set of default intrusion attempts.

The processing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the processing server 535 via the user interface 581 to process insurance policies and/or perform other functions. In some embodiments, the processing server 535 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like)

having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VI. Exemplary User Interfaces

FIGS. 6A and 6B illustrate exemplary interfaces associated with example commands, displays, and actions for electronic devices. An electronic device (e.g., a mobile device, such as a smartphone) may be configured to display the interfaces and/or receive selections and inputs via the interfaces. For example, a dedicated application associated with an insurance provider (or with an independent or assisted living environment) and that is configured to operate on the electronic device may display the interfaces. It should be appreciated that the interfaces are merely examples and that alternative or additional content is envisioned.

FIG. 6A illustrates an interface 650 including details related to situation in which an individual is deemed to be in peril. In particular, the interface 650 may include an alert that details the situation: that data has been detected indicating that John Doe may have experienced a fall. The interface 650 further enables a user of the electronic device to select an appropriate action to take. In particular, the interface 650 may include a "dismiss" selection 651 that, upon selection, may dismiss the interface 650, a "contact" selection 652 that, upon selection, may cause the electronic device to contact John Doe (e.g., via a phone call or text message) or another individual, and a "more info" selection 653 that, upon selection, may retrieve more information related to the situation.

FIG. 6B illustrates an additional interface 655 that may include more information relating to the situation indicated in FIG. 6A. In one implementation, the electronic device may display the interface 655 in response to the user selecting the "more info" selection 653 of the interface 650. The interface 655 may indicate the location of John Doe (as shown: Room 204). Thus, the user of the electronic device may know where to find John Doe within the independent or assisted living environment, and may be better equipped to handle the situation and/or may be afforded with the ability to reach John Doe in a shorter amount of time. The interface 655 may include an "okay" selection 656 that, upon selection, may dismiss the interface 655.

VII. Exemplary Method of Detecting Periled Individuals

In one aspect, a computer-implemented method of detecting periled individuals within an independent or assisted living environment may be provided. The independent or assisted living environment may be populated with a hardware controller in communication with a plurality of sensors. The method may include (1) receiving, by the hardware controller, sensor data from at least one sensor located within the independent or assisted living environment, the at least one sensor either (i) secured to an individual or (ii) configured to sense environmental data within a proximity of the individual; (2) analyzing the sensor data by one or more processors; (3) based upon the analyzing, determining that the individual is in peril; (4) responsive to determining that the individual is in peril, generating a notification indicating that the individual is in peril; and/or (5) communicating the notification to an electronic device of an additional individual to facilitate alleviating a risk associated with the individual being in peril. The method may include additional, less, or alternate actions, including those discussed elsewhere herein, and/or may be implemented via one or more local or remote processors, and/or via computer-executable instructions stored on non-transitory computer-readable media or medium.

In one implementation, receiving the sensor data may include receiving motion data from a wearable device that is removably secured to the individual. In another implementation, analyzing the sensor data may include analyzing the motion data from the wearable device to determine that the individual has experienced a rapid acceleration. In a further implementation, the sensor data may include vital sign data, and analyzing the sensor data may include analyzing the vital sign data to determine that the individual is in need of immediate care.

In a still further implementation, analyzing the sensor data may include (1) analyzing the sensor data to determine a current condition of the individual; (2) receiving updated sensor data from the at least one sensor; and (3) determining, from the updated sensor data, that the current condition is maintained for a threshold period of time.

Additionally, in one implementation, the sensor data may include audio data received from a microphone located within a room of the individual, and wherein analyzing the sensor data may include determining, from the audio data, that the individual has suffered a fall. In another implementation, analyzing the sensor data may include accessing baseline sensor data corresponding to the retrieved sensor data, and comparing the received sensor data to the baseline sensor data. In a further implementation, comparing the received sensor data to the baseline sensor data may include (1) determining a level of similarity between the retrieved sensor data and the baseline sensor data, and (2) determining that the level of similarity meets a threshold value.

In another implementation, communicating the notification to the electronic device may include (1) identifying a caregiver for the individual, and (2) communicating the notification to the electronic device of the caregiver. In an additional implementation, the method may further include identifying an insurance-related event associated with the individual being in peril.

VIII. Exemplary Hardware Controller

In a further aspect, a hardware controller for detecting periled individuals within an independent or assisted living environment, where the hardware controller may communication with a set of sensors populated within the independent or assisted living environment, may be provided. The hardware controller may include (1) a communication module adapted to interface with the set of sensors populated within the independent or assisted living environment; (2) a memory adapted to store non-transitory computer executable instructions; and/or (3) a processor adapted to interface with the communication module and the memory. The processor may be configured to execute the non-transitory computer executable instructions to cause the processor to (a) receive, via the communication module, sensor data from at least one sensor of the set of sensors located within the independent or assisted living environment, the at least one sensor either (i) secured to an individual or (ii) configured to sense environmental data within a proximity of the individual, (b) analyze the sensor data, (c) based upon the analyzing, determine that the individual is in peril, (d) responsive to determining that the individual is in peril, generate a notification indicating that the individual is in peril, and/or (e) communicate, via the communication module, the notification to an electronic device of an additional individual to facilitate alleviating a risk associated with the individual being in peril. The hardware controller may include additional, less, or alternate functionality, including that discussed elsewhere herein.

In one implementation, to receive the sensor data, the processor may be configured to receive motion data from a wearable device that is removably secured to the individual. In another implementation, to analyze the sensor data, the processor may be configured to analyze the motion data from the wearable device to determine that the individual has experienced a rapid acceleration. Further, in one implementation, the sensor data may include vital sign data, and where to analyze the sensor data, the processor may be configured to analyze the vital sign data to determine that the individual is in need of immediate care.

In an additional implementation, to analyze the sensor data, the processor may be configured to analyze the sensor data to (1) determine a current condition of the individual, (2) receive updated sensor data from the at least one sensor, and (3) determine, from the updated sensor data, that the current condition is maintained for a threshold period of time. In a further implementation, the sensor data may include audio data received from a microphone located within a room of the individual, and wherein to analyze the sensor data, the processor may be configured to determine, from the audio data, that the individual has suffered a fall.

Additionally, in one implementation, to analyze the sensor data, the processor is may be configured to (1) access baseline sensor data corresponding to the retrieved sensor data, and (2) compare the received sensor data to the baseline sensor data. In another implementation, to compare the received sensor data to the baseline sensor data, the processor may be configured to (1) determine a level of similarity between the retrieved sensor data and the baseline sensor data, and (2) determine that the level of similarity meets a threshold value.

In one implementation, to communicate the notification to the electronic device, the processor may be configured to (1) identify a caregiver for the individual, and (2) communicate the notification to the electronic device of the caregiver. Moreover, in one implementation, the processor may be further configured to identify an insurance-related event associated with the individual being in peril.

IX. Exemplary Independent Living

The systems and methods may facilitate various functionalities associated with independent and/or assisted living environments. In some implementations, the home controller may analyze various sensor data (e.g., vibrations, sounds, pressure data, etc.) to determine whether an individual has fallen or otherwise detect that individual has suffered an injury or is in a position of immobility. For instance, the sensor data may be acceleration data from a wearable device that indicates a sudden acceleration, which may indicate a fall or other incident.

The controller, and/or the insurance provider remote processing server, may also monitor locations (e.g., via GPS coordinates) of individuals on the premises, as well as receive motion-activated, proximity, and/or connection data from sensors installed at various locations on the premises. The controller, and/or the insurance provider remote processing server, may monitor the temperature of individuals via thermal sensors associated with the individuals. For instance, if the controller, and/or the insurance provider remote processing server, determines that a particular individual's temperature is below a certain threshold for a certain amount of time, then the controller, and/or the insurance provider remote processing server, respectively, may determine that the individual is at risk (and/or that there is an abnormal condition) and may generate and send a notice to another individual of the situation.

The controller, and/or the insurance provider remote processing server, may also establish baseline or "normal" conditions for an individual, a property or portion of the property, and/or may determine whether the individual, and/or one or more properties or parameters deviates from the baseline or "normal" conditions.

As noted, the methods of smart home control and/or automation, or assisted living, detailed above may also include actions directed to independent living. For example, the wired or wireless communication or data transmission, and/or data, received and/or analyzed by the smart home controller or remote processor may include audio data. The smart home controller or remote processor may be configured to determine that an insured has fallen from voice recognition or vibrations contained within the audio data from analysis of the audio data by the smart home controller or remote processor, and/or analyze the audio data to determine an estimated level of severity of an injury for the insured.

The wired or wireless communication or data transmission, and/or data, received and/or analyzed by the smart home controller or remote processor may include GPS (Global Positioning System) data that the smart home controller or remote processor may use or analyze to identify a location of the insured, such as GPS data transmitted from a mobile device, smart watch, smart glasses, smart clothes, or a wearable electronics device.

The wired or wireless communication or data transmission, and/or data, received and/or analyzed by the smart home controller or remote processor may include movement data of persons or animals within the insured home. The smart home controller or remote processor may be configured to determine, from analysis of the movement data by the smart home controller or remote processor, a likelihood of an abnormal condition (e.g., insured home occupant or animal injury, unexpected insured home vacancy, etc.) from a lack of movement within the insured home for a given amount of time or a pre-determined threshold of time, and then issue a message to a mobile device of the insured or a friend or neighbor.

The wired or wireless communication or data transmission, and/or data, received and/or analyzed by the smart home controller or remote processor may include movement data of persons or animals within the insured home. The smart home controller or remote processor may be configured to determine, from analysis of the movement data by the smart home controller or remote processor, a likelihood of an abnormal condition (e.g., unexpected insured home occupancy) from movement detected within the insured home when the insured home is not occupied by the insured, and then issue a message to a mobile device of the insured or a friend or neighbor.

The wired or wireless communication or data transmission, and/or data, received and/or analyzed by the smart home controller or remote processor may include smart door data from a smart garage door or smart door indicating that the smart garage door or smart door has been opened or shut. The smart home controller or remote processor may be configured to compare the smart door data with other data (such as data associated with an amount of electricity usage, operating equipment, or thermal imaging data) to determine whether an occupant has entered or exited an insured home, and, if so, generate an alert to a family member that the occupant has either entered or exited the insured home, respectively.

The wired or wireless communication or data transmission, and/or data, received and/or analyzed by the smart home controller or remote processor may include data regarding the operation of a stove or oven (e.g., temperature, time on, etc.). The smart home controller or remote processor may analyze the data to determine that the stove or oven is on at too high a temperature or has been on for too long a time, and then automatically de-energize or turn off the stove or oven, and/or generate and transmit a corresponding wireless communication message to the insured indicating the abnormal stove or oven condition.

The wired or wireless communication or data transmission, and/or data, received and/or analyzed by the smart home controller or remote processor may include body heat data associated with a body temperature of a person or animal. The smart home controller or remote processor may analyze the body heat data to determine that the body temperature is abnormal (e.g., too cold or too hot), and then generate and transmit a wireless communication message to an insured, family member, friend, neighbor, or caregiver indicating that the body temperature of the person or animal is abnormal.

The wired or wireless communication or data transmission, and/or data, received and/or analyzed by the smart home controller or remote processor may include shower data. The smart home controller or remote processor may analyze the shower data to determine that a person has fallen while taking a shower. The shower data may include pressure data (such as from pressure sensing smart hand rails or pressure sensing smart floor or tub mats). The smart home controller or remote processor may then generate and transmit a wireless communication message to an insured, family member, friend, neighbor, or caregiver indicating that the person has fallen, or has likely fallen, while taking a shower.

The shower data may be generated from pressure sensing matting. The smart home controller or remote processor may be configured to analyze the shower data to determine (a) whether the person that fell has gotten up, (b) a likely severity of a fall taken by the person, and/or (c) whether assistance is likely needed. The smart home controller or remote processor may then generate and transmit a corresponding wireless communication message to an insured, family member, friend, neighbor, or caregiver indicating the situation or that assistance is needed as determined by the smart home controller or remote processor.

The wired or wireless communication or data transmission, and/or data, received and/or analyzed by the smart home controller or remote processor may include data indicating a normal routine of a person (e.g., time of day they usually wake, go to sleep, shower, cook, watch television, use a computer or other electronics, etc.). The smart home controller or remote processor may be configured to learn, from analysis of the data by the smart home controller or remote processor, the normal routine of the person over time, and compare present data indicating a current time and/or an activity of the person with the normal routine of the person learned to detect potential abnormal conditions. After which, the smart home controller or remote processor may then generate and transmit a corresponding wireless communication message to an insured, family member, friend, neighbor, or caregiver indicating an abnormal condition detected by the smart home controller or remote processor.

The wired or wireless communication or data transmission, and/or data, received and/or analyzed by the smart home controller or remote processor may include data indicating vitals (e.g., blood pressure, heart rate, oxygen levels, etc.) of an occupant of the insured home. The smart home controller or remote processor may analyze the data indicating vitals to detect or determine an abnormal or unhealthy condition. After which, the smart home controller or remote processor may generate and transmit a message to an insured or family members of the occupant when the vitals indicate an abnormal or unhealthy condition of the occupant, as determined or detected by the smart home controller or remote processor.

The wired or wireless communication or data transmission, and/or data, received and/or analyzed by the smart home controller or remote processor may include data indicating that an infant or young child (1) is in a vicinity of, or in, a swimming pool located within a yard of the insured home, and (2) is not being supervised by an adult. In response to determining such from analysis of the data (and/or based upon the analysis by the smart home controller or remote processor of the wired or wireless communication or data transmission, and/or data received), the smart home controller or remote processor may generate and transmit an electronic warning or message to the insured or family members to facilitate appropriate supervision in the vicinity of the swimming pool.

The wired or wireless communication or data transmission, and/or data, received and/or analyzed by the smart home controller or remote processor may include a body heat reading of an occupant of the insured home. The smart home controller or remote processor may determine, based upon the analysis by the smart home controller or remote processor of the wired or wireless communication or data transmission, and/or data received, that the body heat of the occupant is too cold or too hot (as compared to normal), and then remotely adjust a smart thermostat setting accordingly (e.g., (1) if the occupant's body temperature is too hot, then the smart home controller or remote processor may direct or control turning on the air conditioning or adjusting the air conditioning, or (2) if the occupant's body temperature is too cold, then the smart home controller or remote processor may direct or control turning on the furnace/heat or adjusting the furnace setting) to maintain an appropriate temperature within the insured home and/or health of the occupant.

The wired or wireless communication or data transmission, and/or data, received and/or analyzed by the smart home controller or remote processor may include bed data gathered from a bed sensor, smart bed, or bed room camera indicating an abnormal condition or that a person has remained in bed for an abnormal period of time. Based upon the analysis by the smart home controller or remote processor of the bed data, the smart home controller or remote processor may determine that the abnormal condition exists or that the person has remained in bed for an abnormal period of time. After which, the smart home controller or remote processor may generate and transmit a corresponding wireless communication message to an insured, family member, friend, neighbor, or caregiver indicating the abnormal condition exists or that the person has remained in bed for an abnormal amount of time.

The wired or wireless communication or data transmission, and/or data, received and/or analyzed by the smart home controller or remote processor may include gas data gathered from, or generated by, a gas sensor, detector, or meter indicating a gas or natural gas leak within the insured home. Based upon the analysis by the smart home controller or remote processor of the gas data, the smart home controller or remote processor may determine that an abnormal condition exists, such as the gas or natural gas leak exists, within the home. The smart home controller or remote processor may generate and transmit a corresponding wireless communication message to an insured, family member, friend, neighbor, or caregiver indicating that the abnormal condition, or gas or natural gas leak, exists.

The wired or wireless communication or data transmission, and/or data, received and/or analyzed by the smart home controller or remote processor may include odor data gathered from, or generated by, an odor detector, sensor, or meter indicating an abnormal odor condition within the insured home. Based upon the analysis by the smart home controller or remote processor of the odor data, the smart home controller or remote processor may determine that the abnormal odor condition exists within the home. The smart home controller or remote processor may then generate and transmit a corresponding wireless communication message to an insured, family member, friend, neighbor, or caregiver indicating that the abnormal odor condition exists.

The wired or wireless communication or data transmission, and/or data, received and/or analyzed by the smart home controller or remote processor may include smell data gathered from, or generated by, a smell detector, sensor, or meter indicating an abnormal smell condition within the insured home. Based upon the analysis by the smart home controller or remote processor of the smell data, the smart home controller or remote processor may determine that the abnormal smell condition exists within the home. The smart home controller or remote processor may then generate and transmit a corresponding wireless communication message to an insured, family member, friend, neighbor, or caregiver indicating that the abnormal smell condition exists.

The wired or wireless communication or data transmission, and/or data, received and/or analyzed by the smart home controller or remote processor may include mold data gathered from, or generated by, a mold detector, sensor, or meter indicating an abnormal mold condition within the insured home. Based upon the analysis by the smart home controller or remote processor of the mold data, the smart home controller or remote processor may determine that the abnormal mold condition exists within the home. The smart home controller or remote processor may then generate and transmit a corresponding wireless communication message to an insured, family member, friend, neighbor, or caregiver indicating that the abnormal mold condition exists.

The wired or wireless communication or data transmission, and/or data, received and/or analyzed by the smart home controller or remote processor may include temperature data gathered from, or generated by, a temperature detector, sensor, or meter indicating an abnormal temperature condition within the insured home. Based upon the analysis by the smart home controller or remote processor of the temperature data, the smart home controller or remote processor may determine that the abnormal temperature condition exists within the home. The smart home controller or remote processor may then generate and transmit a corresponding wireless communication message to an insured, family member, friend, neighbor, or caregiver indicating that the abnormal temperature condition exists.

The wired or wireless communication or data transmission, and/or data, received and/or analyzed by the smart home controller or remote processor may include humidity data gathered from, or generated by, a humidity detector, sensor, or meter indicating an abnormal humidity condition within the insured home. Based upon the analysis by the smart home controller or remote processor of the humidity data, the smart home controller or remote processor may determine that the abnormal humidity condition exists within the home. The smart home controller or remote processor may then generate and transmit a corresponding wireless communication message to an insured, family member, friend, neighbor, or caregiver indicating that the abnormal humidity condition exists.

The wired or wireless communication or data transmission, and/or data, received and/or analyzed by the smart home controller or remote processor may include moisture data gathered from, or generated by, a moisture detector, sensor, or meter indicating an abnormal moisture condition within the insured home. Based upon the analysis by the smart home controller or remote processor of the moisture data, the smart home controller or remote processor may determine that the abnormal moisture condition exists within the home. The smart home controller or remote processor may then generate and transmit a corresponding wireless communication message to an insured, family member, friend, neighbor, or caregiver indicating that the abnormal moisture condition exists.

The wired or wireless communication or data transmission, and/or data, received and/or analyzed by the smart home controller or remote processor may include sound data gathered from, or generated by, a sound detector, sensor, or meter indicating an abnormal sound condition within the insured home. Based upon the analysis by the smart home controller or remote processor of the sound data, the smart home controller or remote processor may determine that the abnormal sound condition exists within the home. The smart home controller or remote processor may then generate and transmit a corresponding wireless communication message to an insured, family member, friend, neighbor, or caregiver indicating that the abnormal sound condition exists.

The gas, odor, smell, mold, temperature, humidity, moisture, or sound data may be analyzed at or via the smart home controller or remote processor. From the data analysis, the smart home controller or remote processor may determine a likely cause of an associated abnormal gas, odor, smell, mold, temperature, humidity, moisture, or sound condition, respectively. The methods discussed herein may include (1) directing or controlling, at or via the smart home controller or remote processor, various smart home equipment to mitigate the abnormal gas, odor, smell, mold, temperature, humidity, moisture, or sound condition, respectively (such as operating fans, or smart ventilation, air conditioning, furnace, heating, environmental, or other smart equipment); (2) generating an insurance claim, at or via the smart home controller or remote processor, associated with the abnormal gas, odor, smell, mold, temperature, humidity, moisture, or sound condition, respectively; (3) handling or processing the insurance claim, at or via the smart home controller or remote processor, associated with the abnormal gas, odor, smell, mold, temperature, humidity, moisture, or sound condition, respectively; and/or (4) updating, at or via the smart home controller or remote processor, a premium, rate, or discount for an insurance policy associated with, or covering, the insured home and/or insured or occupant of the insured home based upon the abnormal gas, odor, smell, mold, temperature, humidity, moisture, or sound condition, respectively.

The gas, odor, smell, mold, temperature, humidity, moisture, or sound data may be analyzed at or via the smart home controller or remote processor to determine a corresponding abnormal condition, or a likely cause of the abnormal condition. For instance, the smart home controller or remote processor may receive gas, odor, smell, mold, temperature, humidity, moisture, or sound data indicative of actual gas, odor, smell, mold, temperature, humidity, moisture, or sound conditions within the insured home. The smart home controller or remote processor may compare the gas, odor, smell, mold, temperature, humidity, moisture, or sound data received with expected gas, odor, smell, mold, temperature, humidity, moisture, or sound data or conditions stored in a memory unit, and if differences exist, the smart home controller or remote processor may determine that a corresponding abnormal condition exists and/or determine a cause (or potential cause) of the corresponding abnormal condition. Additionally or alternatively, the smart home controller or remote processor may compare the gas, odor, smell, mold, temperature, humidity, moisture, or sound data received with a baseline of "normal" gas, odor, smell, mold, temperature, humidity, moisture, or sound data or conditions of the insured home gathered over time and/or stored in a memory unit, and if differences exist, the smart home controller or remote processor may determine that a corresponding abnormal condition exists and/or determine a cause (or potential cause) of the corresponding abnormal condition.

The wired or wireless communication or data transmission, and/or data, received and/or analyzed by the smart home controller or remote processor may include data regarding the operation of a stove or oven (e.g., temperature, time on, etc.). Based upon the analysis by the smart home controller or remote processor of the data, the smart home controller or remote processor may determine that an abnormal condition exists within the home. For instance, the smart home controller or remote processor may analyze the data to determine that the stove or oven has been left unattended for too long, and automatically turn off or de-energize the stove or oven, respectively, and/or generate and transmit a corresponding wireless communication message to the insured or a family member indicating that the abnormal condition exists and/or that the stove or oven has been automatically turned off.

The wired or wireless communication or data transmission, and/or data, received and/or analyzed by the smart home controller or remote processor may include data regarding running water (e.g., washer, tub, shower, etc.). Based upon the analysis by the smart home controller or remote processor of the data, the smart home controller or remote processor may determine that an abnormal condition exists within the home. For instance, the smart home controller or remote processor may analyze the data to determine that the running water has been flowing for too long or left unattended for too long, and automatically turn off or de-energize an electrical valve (e.g., solenoid valve) or stop a source of the flowing water, and/or generate and transmit a corresponding wireless communication message to the insured or a family member indicating that the abnormal condition exists and/or that the water has been automatically turned off.

The wired or wireless communication or data transmission, and/or data, received and/or analyzed by the smart home controller or remote processor may include fireplace data regarding fireplace operation (e.g., flue, duct, or damper position, chimney opening, gas, etc.). Based upon the analysis by the smart home controller or remote processor of the data, the smart home controller or remote processor may determine that an abnormal condition exists within the home. For instance, the smart home controller or remote processor may analyze the data to determine that an abnormal fireplace conditions exists (e.g., flue or damper in wrong position, gas on or off, chimney plugged with debris or bird nest, smoke is collecting on the interior of the insured home, etc.). In response, the smart home controller or remote processor may generate and transmit an associated alert or message, and/or automatically direct or control (such as via wireless communication) the operation of smart equipment to alleviate the impact of the abnormal fireplace condition (e.g., opens, closes, moves or changes flue or damper position; opens, closes, or operates a gas valve; starts or operates ventilation equipment or fans to move smoke out of the interior of the insured home; prevents closing damper(s) until the temperature of the fireplace has cooled down to a predetermined set point after use, etc.).

X. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance. In one instance, a smart thermostat may be able to remotely communicate the current temperature of the home and receive instructions to adjust the temperature to a new level. In another instance, a smart water tank may be able to remotely communicate the water level contained therein and receive instructions to restrict the flow of water leaving the tank. In contrast, "dumb" devices, sensors, or appliances located within or proximate to a property require manual control. Referring again to the thermostat embodiment, to adjust the temperature on a "dumb" thermostat, a person would have to manually interact with the thermostat. As such, a person is unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In embodiments in which an appliance and a sensor external to the particular appliance are associated with each other, "smart device" may refer to both the external sensors and the appliance collectively. Some exemplary devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual is a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission. The data collected may be related to insured assets or individuals before (and/or after) an insurance-related event, including those events discussed elsewhere herein. In return, risk averse insureds, home owners, home or apartment occupants, or care givers may receive discounts or insurance cost savings related to life, home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to home or apartment occupants, and/or insured assets, such as homes, personal belongings, or vehicles.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to property or care-type insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For instance, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of detecting periled individuals within an independent or assisted living environment, the independent or assisted living environment populated with a hardware controller in communication with a plurality of sensors, the method comprising:
   receiving, by the hardware controller, sensor data from a wearable device removably secured to an individual and located within the independent or assisted living environment, wherein the sensor data indicates a heart rate of the individual;
   analyzing, by one or more processors, the sensor data to determine that the heart rate of the individual exceeds a threshold rate;
   receiving, by the hardware controller, updated sensor data from the wearable device, wherein the updated sensor data indicates (i) an updated heart rate of the individual, and (ii) a type of room of the independent or assisted living environment in which the individual is located;
   analyzing, by the one or more processors, the updated sensor data to determine that the updated heart rate exceeds the threshold rate;
   in response to determining that the updated heart rate exceeds the threshold rate, determining, based on the type of room in which the individual is located, that the individual is in peril;
   responsive to determining that the individual is in peril, automatically and without user intervention generating a notification indicating that the individual is in peril; and communicating the notification to an electronic device of an additional individual to facilitate alleviating a risk associated with the individual being in peril.

2. The computer-implemented method of claim 1, wherein receiving the sensor data comprises:
receiving motion data from the wearable device.

3. The computer-implemented method of claim 2, wherein analyzing the sensor data comprises:
analyzing the motion data from the wearable device to determine that the individual has experienced a rapid acceleration.

4. The computer-implemented method of claim 1, wherein the sensor data includes audio data received from a microphone located within a room of the individual, and wherein analyzing the sensor data comprises:
determining, from the audio data, that the individual has suffered a fall.

5. The computer-implemented method of claim 1, wherein analyzing the sensor data comprises:
accessing baseline sensor data corresponding to the retrieved sensor data; and
comparing the received sensor data to the baseline sensor data.

6. The computer-implemented method of claim 5, wherein comparing the received sensor data to the baseline sensor data comprises:
determining a level of similarity between the retrieved sensor data and the baseline sensor data, and
determining that the level of similarity meets a threshold value.

7. The computer-implemented method of claim 1, wherein communicating the notification to the electronic device comprises:
identifying a caregiver for the individual; and
communicating the notification to the electronic device of the caregiver.

8. The computer-implemented method of claim 1, further comprising:
identifying an insurance-related event associated with the individual being in peril.

9. A hardware controller for detecting periled individuals within an independent or assisted living environment, the hardware controller in communication with a set of sensors populated within the independent or assisted living environment, comprising:
a communication module adapted to interface with the set of sensors populated within the independent or assisted living environment, the set of sensors comprising a wearable device removably secured to an individual and located within the independent or assisted living environment;
a memory adapted to store non-transitory computer executable instructions; and
a processor adapted to interface with the communication module and the memory, wherein the processor is configured to execute the non-transitory computer executable instructions to cause the processor to:
receive, via the communication module, sensor data from the wearable device, wherein the sensor data indicates a heart rate of the individual,
analyze the sensor data to determine that the heart rate of the individual exceeds a threshold rate,
receive updated sensor data from the wearable device, wherein the updated sensor data indicates (i) an updated heart rate of the individual, and (ii) a type of room of the independent or assisted living environment in which the individual is located,
analyze the updated sensor data to determine the updated heart rate exceeds the threshold rate,
in response to determining that the updated heart rate exceeds the threshold rate, determine, based on the type of room in which the individual is located, that the individual is in peril,
responsive to determining that the individual is in peril, automatically and without user intervention generate a notification indicating that the individual is in peril, and
communicate, via the communication module, the notification to an electronic device of an additional individual to facilitate alleviating a risk associated with the individual being in peril.

10. The hardware controller of claim 9, wherein the sensor data comprises motion data from the wearable device.

11. The hardware controller of claim 10, wherein to analyze the sensor data, the processor is configured to:
analyze the motion data from the wearable device to determine that the individual has experienced a rapid acceleration.

12. The hardware controller of claim 9, wherein the sensor data includes audio data received from a microphone located within a room of the individual, and wherein to analyze the sensor data, the processor is configured to:
determine, from the audio data, that the individual has suffered a fall.

13. The hardware controller of claim 9, wherein to analyze the sensor data, the processor is configured to:
access baseline sensor data corresponding to the retrieved sensor data, and
compare the received sensor data to the baseline sensor data.

14. The hardware controller of claim 13, wherein to compare the received sensor data to the baseline sensor data, the processor is configured to:
determine a level of similarity between the retrieved sensor data and the baseline sensor data, and
determine that the level of similarity meets a threshold value.

15. The hardware controller of claim 9, wherein to communicate the notification to the electronic device, the processor is configured to:
identify a caregiver for the individual, and
communicate the notification to the electronic device of the caregiver.

16. The hardware controller of claim 9, wherein the processor is further configured to:
identify an insurance-related event associated with the individual being in peril.

* * * * *